United States Patent
Anderson et al.

(10) Patent No.: US 7,123,133 B2
(45) Date of Patent: Oct. 17, 2006

(54) COMBINED BACK-UP AND BATTERY LOW-LEVEL ALARM FOR VEHICLE

(75) Inventors: Dennis N. Anderson, Meridian, ID (US); James E. Stewart, Jr., Middleton, ID (US); Eric C. Paul, Fort Worth, TX (US); Alfred Pelot, Boise, ID (US)

(73) Assignee: Preco Electronics, Inc., Boise, ID (US)

( * ) Notice: Subject to any disclaimer, the term of this patent is extended or adjusted under 35 U.S.C. 154(b) by 11 days.

(21) Appl. No.: 10/825,854

(22) Filed: Apr. 15, 2004

(65) Prior Publication Data

US 2005/0231338 A1 Oct. 20, 2005

(51) Int. Cl.
*B60Q 1/00* (2006.01)

(52) U.S. Cl. .............. 340/435; 340/932.2; 340/636.1; 340/463

(58) Field of Classification Search .............. 307/10.8, 307/9.1; 340/435, 932.2, 636.1, 463, 468, 340/474; 701/93, 301
See application file for complete search history.

(56) References Cited

U.S. PATENT DOCUMENTS

| | | | | |
|---|---|---|---|---|
| 2,431,117 A | 11/1947 | Hadley | ..................... | 177/339 |
| 2,462,532 A | 2/1949 | Morris | ..................... | 179/1 |
| 2,517,629 A | 8/1950 | Buys et al. | ..................... | 179/1 |
| 3,173,136 A | 3/1965 | Atkinson | ..................... | 340/384 |
| 3,522,481 A | 8/1970 | Terzic | ..................... | 317/31 |
| 3,568,175 A | 3/1971 | Schwehr et al. | ..................... | 340/249 |
| 3,576,488 A | 4/1971 | Zug et al. | ..................... | 320/48 |
| 3,852,732 A | 12/1974 | Yorksie et al. | ..................... | 340/249 |
| 3,932,797 A | 1/1976 | York | ..................... | 320/48 |
| 3,934,188 A | 1/1976 | York | ..................... | 320/48 |
| 3,979,657 A | 9/1976 | Yorksie | ..................... | 320/13 |
| 3,997,888 A | 12/1976 | Kremer | ..................... | 340/249 |
| 4,086,524 A | 4/1978 | Kremer | ..................... | 320/33 |
| 4,258,306 A | 3/1981 | Bourke et al. | ..................... | 320/48 |
| 4,388,618 A | 6/1983 | Finger | ..................... | 340/636 |
| 4,460,870 A | 7/1984 | Finger | ..................... | 324/429 |
| 4,492,955 A | 1/1985 | Kubota et al. | ..................... | 340/636 |
| 4,600,913 A * | 7/1986 | Caine | ..................... | 340/435 |
| 4,603,317 A | 7/1986 | Gailbreath et al. | ..................... | 340/70 |
| 4,697,134 A | 9/1987 | Burkum et al. | ..................... | 320/48 |
| 4,943,777 A | 7/1990 | Nakamura et al. | ..................... | 324/433 |
| 5,159,272 A | 10/1992 | Rao et al. | ..................... | 324/429 |
| 5,179,494 A | 1/1993 | Matsubara | ..................... | 361/91 |
| 5,206,578 A | 4/1993 | Nor | ..................... | 320/14 |
| 5,345,163 A | 9/1994 | Gibbons et al. | ..................... | 320/48 |
| 5,656,919 A | 8/1997 | Proctor et al. | ..................... | 320/30 |
| 5,887,302 A | 3/1999 | DiMucci et al. | ..................... | 5/611 |

(Continued)

*Primary Examiner*—Anh V. La
(74) *Attorney, Agent, or Firm*—Pedersen & Co., PLLC; Ken J. Pedersen; Barbara S. Pedersen

(57) ABSTRACT

The present invention relates to a system for use in motorized vehicles to provide a vehicle back-up alarm system, intended for mounting on a vehicle, that also incorporates an apparatus for detecting and alarming low battery conditions. Preferably incorporated into a main housing are the electronic components that perform power regulation, system control, voltage sensing, timing, alarm tone generation, sound emitting and, optionally, light emitting. The housing serves to securely fix and retain these components and to protect them from moisture and dirt. The circuitry is connected to the vehicle upon which it is installed by preferably three connection terminals situated on the housing. Distinctive tones and/or lamp sequences alert the operator and those by-standers within proximity to the vehicle to different alarm conditions.

4 Claims, 5 Drawing Sheets

U.S. PATENT DOCUMENTS

| | | | |
|---|---|---|---|
| 5,900,734 A | 5/1999 | Munson | 324/433 |
| 6,008,546 A * | 12/1999 | Sage | 307/9.1 |
| 6,028,511 A | 2/2000 | Peterson et al. | 340/463 |
| 6,064,302 A | 5/2000 | Peterson et al. | 340/463 |
| 6,091,325 A | 7/2000 | Zur et al. | 340/455 |
| 6,325,176 B1 | 12/2001 | Jensen | 187/222 |
| 6,417,668 B1 | 7/2002 | Howard et al. | 324/426 |
| 6,864,782 B1 * | 3/2005 | Aaron et al. | 340/431 |
| 6,873,250 B1 * | 3/2005 | Viana et al. | 340/435 |
| 2002/0171541 A1 | 11/2002 | Crombez et al. | 340/461 |
| 2003/0009270 A1 | 1/2003 | Breed | 701/29 |

* cited by examiner

COMBINED BACK-UP AND BATTERY LOW-LEVEL ALARM FOR VEHICLE

BACKGROUND OF THE INVENTION

1. Field of the Invention

The present invention relates generally to electrically operated vehicle back-up alarms. More specifically, this invention relates to a combined back-up and battery low-level alarm for a vehicle.

2. Description of Related Art

A variety of low battery voltage alarm systems are known in the prior art. For instance, U.S. Pat. No. 5,900,734 to Munson, U.S. Pat. No. 4,943,777 to Nakamura. et al., and U.S. Pat. No. 3,979,697 to Yorksie all disclose battery voltage detection and warning devices.

Separately, there also exist a variety of vehicle back-up safety alarm systems in the prior art. These alarms include those described in U.S. Pat. No. 4,603,317 to Gailbreath. et al., U.S. Pat. No. 3,173,136 to Atkinson, U.S. Pat. No. 2,517,629 to Buys et al., U.S. Pat. No. 2,462,532 to Morris, and U.S. Pat. No. 2,431,117 to Hadley. Of particular interest for relevant back-up alarms are those manufactured and distributed by PRECO Electronics, Inc. under its trademark BAC-A-LARM®.

However, none of the prior art discloses a detection and signaling device having the combination of back-up and low-battery alarm features and the distinct advantages of the present invention.

SUMMARY OF THE INVENTION

It is an object of the present invention to provide a vehicle back-up alarm system intended for mounting on a vehicle that also incorporates an apparatus for detecting and alarming low battery conditions in the same vehicle. According to the preferred embodiment of the invention, incorporated into a main housing are all the required electronic components that perform power regulation, system control, voltage sensing, timing, alarm tone generation, sound emitters and optional light emitters for a combined back-up and battery low-level alarm. The housing serves to securely fix and retain these components and to protect them from moisture and dirt. Also, the single housing provides for a convenient and effective package for original equipment manufacture (OEM) and retrofit markets. The alarm circuitry is connected to the vehicle upon which it is installed, preferably by three connection terminals situated on the housing. Preferably distinctive tones and tone sequences provided by the tone generation circuitry alert the operator to different types of alarm conditions, either back-up or low battery conditions. An optional signaling lamp and ambient light sensor may also be incorporated to allow for quiet nighttime alarm operation in noise-sensitive areas.

As will be put forth in the following detailed description, accompanying drawings and claims, the present invention provides practical and useful methods and apparatus both for sensing low battery conditions and for alerting operators and by-standers of back-up operating vehicles, which methods and apparatus realize a high benefit of vehicle safety and accident prevention.

DETAILED DESCRIPTION OF THE INVENTION

Figure 1:
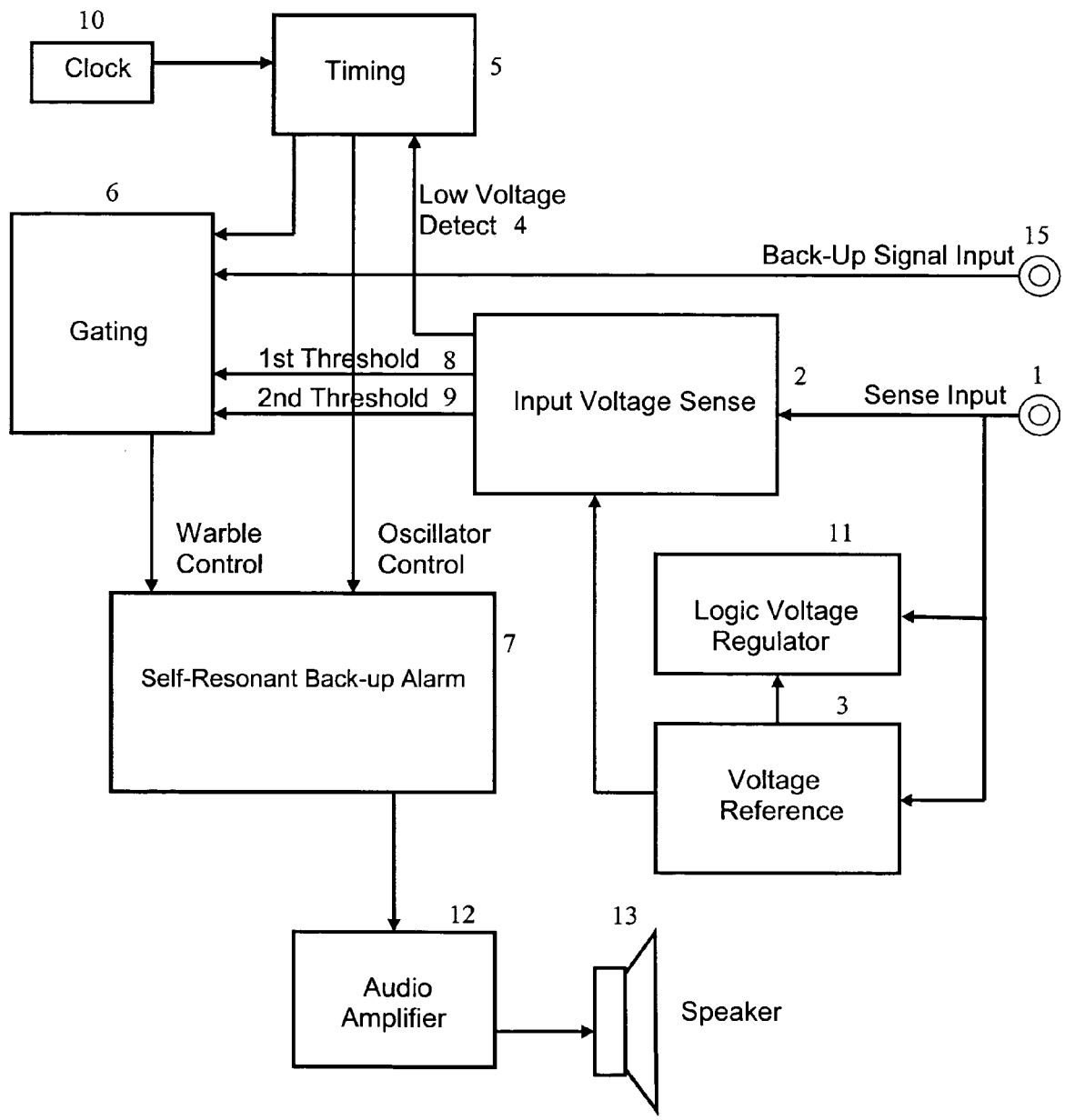
FIG. 1 is a schematic electrical block diagram of the preferred embodiment of the present invention.

The present invention provides at least two modes of safety for vehicles, including industrial trucks, forklifts, and especially bucket lift trucks or man lifts. By the combination of preferred features, those persons within proximity of the vehicle are warned whenever said vehicle is backing-up. Vehicle or bucket lift operators are also warned of low battery conditions, such that they have early knowledge of potential danger, for example, due to a critical loss of power of their lifting and positioning equipment.

As a backup alarm, the preferred embodiment conforms to SAE standard J994 Type C, producing a 1200 Hz tone with a 97 dB sound level, measured at a distance of four feet. The preferred embodiment also is capable of providing a warble sound at a level of 97 dB, to alert operators of a low battery voltage condition.

Self-resonant back-up alarm oscillator circuitry, as described in U.S. Pat. No. 5,596,311 to Bess, et al is employed in the preferred embodiment to provide superior sound output performance throughout the life of the product. Other similar systems may be employed in alternate embodiments to effect desired alarm sound and or optional light outputs. Preferably, the componentry of the preferred embodiment is fully contained within a single, preferably plastic housing.

In the preferred embodiment, the backup alarm and low voltage alarm may be operated together or independently. If the backup alarm is energized during a low voltage condition, the backup alarm will take priority. Power for battery voltage sensing, internal reference and logic supplies may be sourced in one of two ways: a) Continuous Operation via connection to the battery/alternator (battery side of vehicle key switch), or b) Active Operation via connection to the ignition side of the vehicle key switch.

An important aspect of the preferred embodiment of the invention, regarding its low battery detection circuitry, is the capability of sensing two or more voltage points with different timing algorithms being associated with each voltage point, thereby detecting discharge to a higher degree of accuracy over varying battery loads. For example, in the preferred embodiment, if either a) the battery voltage drops to less than 12.0 volts for five minutes, or b) the battery voltage drops to less than 11.5 volts for one minute, the alarm will be triggered. For either of these instances, once the battery voltage climbs again above 12.0 volts, the alarm will be reset.

In the preferred embodiment, the alarm tone that signals a low battery condition is distinctively different from a standard back-up alarm tone. For example, the low battery alarm tone is preferably a four second warble sound, occurring once each minute. This is in contrast to the preferred back-up alarm tone, namely a 1200 Hz tone repeating at a rate of 80 pulses per minute. After eight minutes total time from first detection of less than a 12.0 volt level, the alarm will be automatically reset and the low voltage function silenced. This feature is implemented in order to prevent the low-battery alarm from running continuously, and entirely draining the battery.

Figure 5:
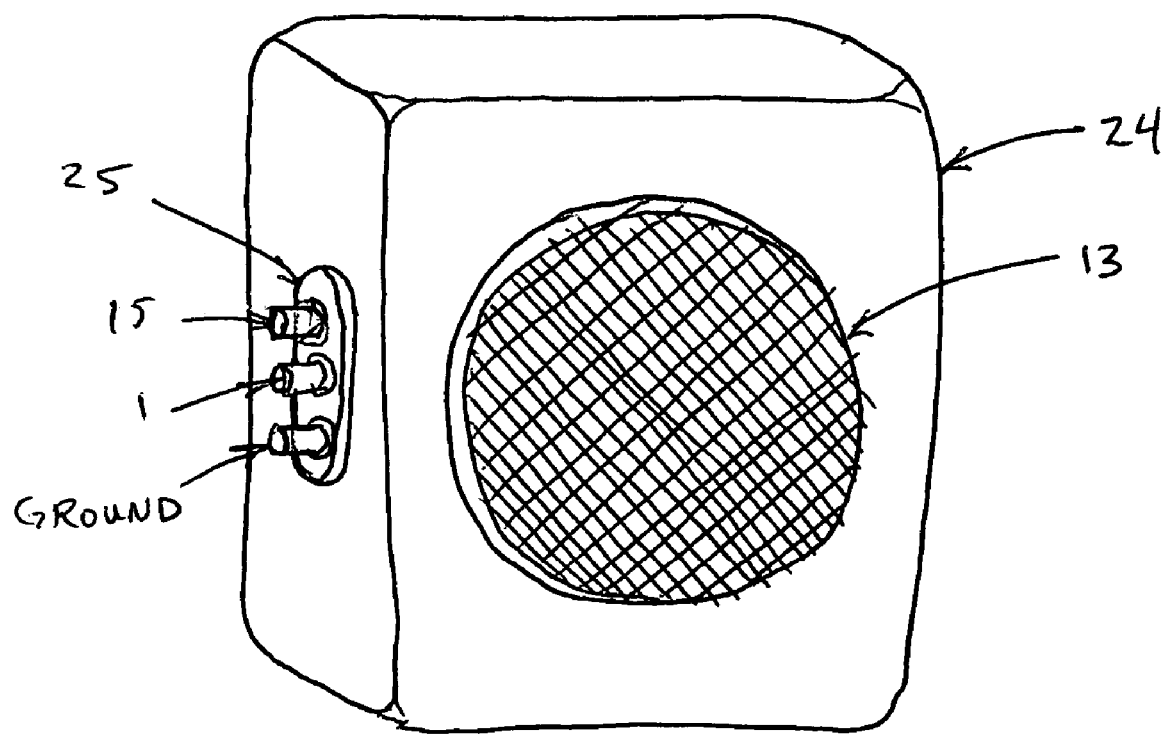
FIG. 5 is a perspective view of a single-housing embodiment of the combined alarm of the present invention.

A typical housing for the circuitry is a molded plastic enclosure 24, for example, one constructed of glass filled nylon polymer, as depicted in FIG. 5. The preferred embodiment has approximate dimensions of: H 2.5"; W 4"; D 1.5", mounted by way of two 0.3" holes on 3.25" centers, on the back and bottom of the housing. The three wiring terminals 25 may consist of three #8-32 UNC terminal studs. An operating input voltage of 9 to 16 volts allows for connection to typical 12-volt automotive vehicle electrical systems. FIG. 5 also depicts Speaker 13, Back-up Signal Input 15, Sense Input 1, and a Signal Ground connection.

With reference now to the accompanying Figures, FIG. 1 is a schematic block diagram of the preferred embodiment of the present invention, depicting its major circuit elements. Sense Input 1 is input to an Input Voltage Sense circuit 2. The function of the Input Voltage Sense circuit 2 is to perform a comparison between the Voltage Reference 3 output and Sense Input 1. If Sense Input voltage 1 falls below 12.0 volts, then the Low Voltage Detect signal 4 becomes active, turning on Timing Circuit 5. Conversely, if the Low Voltage Detect signal 4 becomes inactive, then the Timing Circuit 5 will be reset immediately, requiring another voltage dip below 12.0 volts in order to re-activate. Timing Circuit 5 has output signals that become active when timing cycles are completed. The output signals, in conjunction with the two Voltage Threshold signals 8 and 9, control the operation of Gating circuit 6 and Self-Resonant Back-up Alarm circuit 7. Voltage Threshold signals 8 and 9 become active when the battery voltage falls below threshold levels, which are settable according to resistor divider arrays in Input Voltage Sense Circuit 2, but in the preferred embodiment are set respectively to 12.0 and 11.5 volts.

A signal that is pre-emptive of any other in the circuit is that of Back-up Signal Input 15, which typically is an input from the reverse switch in the vehicle onto which the invention is installed. When this signal activates, it immediately enables Gating circuit 6 to start Self-Resonant Back-up Alarm circuit 7, which outputs the standard on-off back-up alarm signal sequence for as long as that input signal is active.

The main time base for all timings in this circuit is Clock source 10, and the power supply source for all circuitry is Logic Voltage Regulator 11. Signals from Self-Resonant Back-up Alarm circuit 7 are amplified by Audio Amplifier circuit 12, and are converted to sound energy by Speaker 13.

Figure 2:
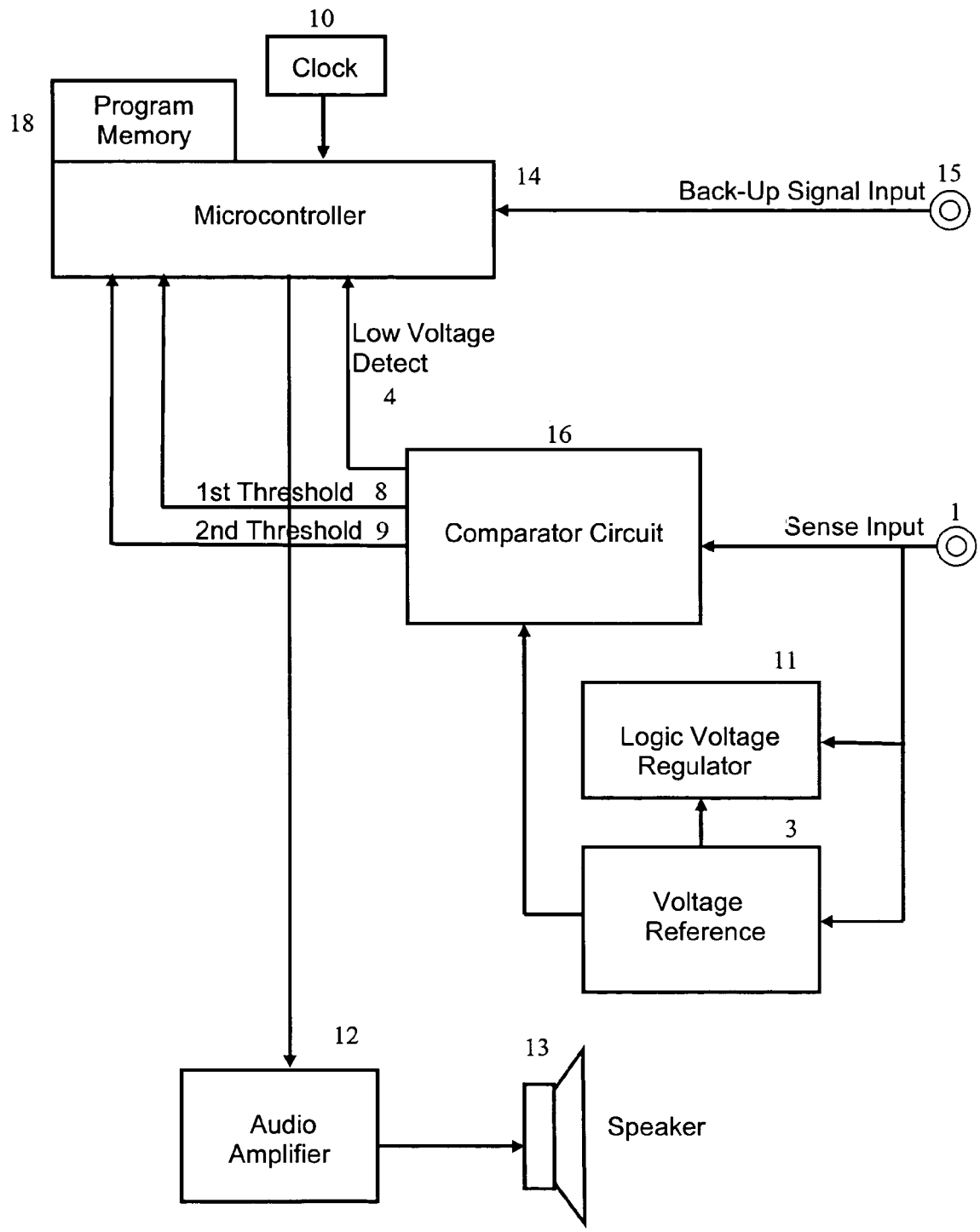
FIG. 2 is a schematic electrical block diagram of an alternate embodiment of the present invention.
Figure 3:
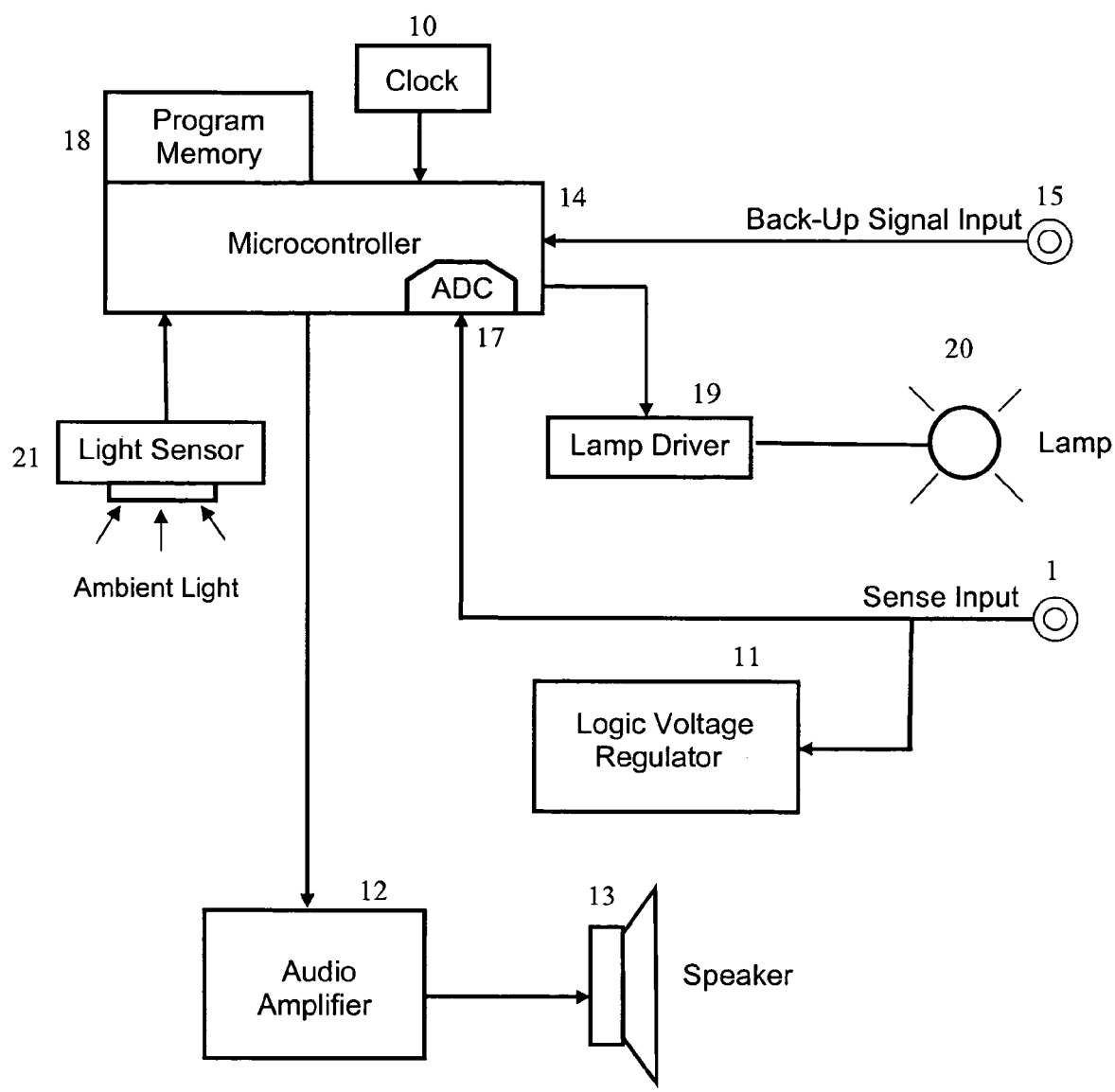
FIG. 3 is a schematic electrical block diagram of another alternate embodiment of the present invention.

FIGS. 2 and 3 are each schematic block diagrams of two separate alternate embodiments of the present invention. In a similar way to the preferred embodiment, clock 10 supplies all timings in these circuits, and the requisite power source for all circuitry is Logic Voltage Regulator 11. Each circuit also incorporates Audio Amplifier circuit 12 and Speaker 13, similar to the preferred embodiment, as previously described above and as depicted in FIG. 1. The circuit of FIG. 2 employs a Microcontroller 14 that operates according to the embedded software contained in Program Memory 18. Inputs to the Microcontroller 14 are from Back-up Signal Input 15, Low Voltage Detect Signal 4, first threshold 8 and second threshold 9 from Comparator circuit 16. From these inputs, the microcontroller, through operation by programmed control, interprets the machine state and performs appropriate audio tone generation output to Audio Amplifier 12 in response. The function of this circuit can be made to perform in much the same, if not identical, manner to the circuit of FIG. 1, according to conventional techniques. The Comparator Circuit 16 of FIG. 2 performs a similar function to the Input Voltage Sense 2 of FIG. 1. The function of Gating 6, Timing 5, and Self-Resonant Back-up Alarm 7 circuits of FIG. 1 can each be accomplished by programmed control within Microcontroller 14 of FIG. 2 according to conventional techniques. Such a program controlled device can also generate different tone sequences, if end users wish to incorporate them.

FIG. 3 depicts a variation of a microcontroller circuit in which there is incorporated an Analog to Digital converter (ADC) 17, as featured in many varieties of commercially available microcontrollers. Microcontroller 14 again operates according to the embedded software contained in Program Memory 18. Sense Input 1 is an analog voltage that is converted to digital data words upon successive samples of ADC 17. These converted data words are typically stored following preliminary digital signal processing steps, executed from Program Memory 18. For example, high and low (or more than two) threshold constants can be stored in program memory, and a rolling average would be typically performed on the incoming Sense Voltage to provide smoother values to be used for comparison to these different threshold levels. Such an averaging step on raw data prevents spurious timer events due to noise spikes that might be present on Sense Input 1.

From the result of the comparisons, and through internal timing conditions, each as controlled according to the steps contained in Program Memory 18, Microcontroller 14 interprets the machine state and performs appropriate audio tone generation output to Audio Amplifier 12 in response. The function of this circuit can be made to perform in much the same, if not identical manner to the circuits of FIG. 1 and FIG. 2.

An extra, optional feature of the embodiment as depicted in FIG. 3 is the incorporation of a Lamp Driver circuit 19 and signaling Lamp 20. The incorporation of a signaling lamp allows for both audio and visual notification of alerts to the vehicle operator and to those within its path of movement when backing-up. Another feature is Ambient Light Sensor 21, which signals Microcontroller 14 of relatively light and dark ambient light conditions, thereby allowing for automatic selection of light-based alarm operation at night and sound-based alarm operation during the daytime, for example. This feature can allow for quiet operation at nighttime in noise sensitive areas, such as where industrial yards are located near neighborhoods.

Figure 4:
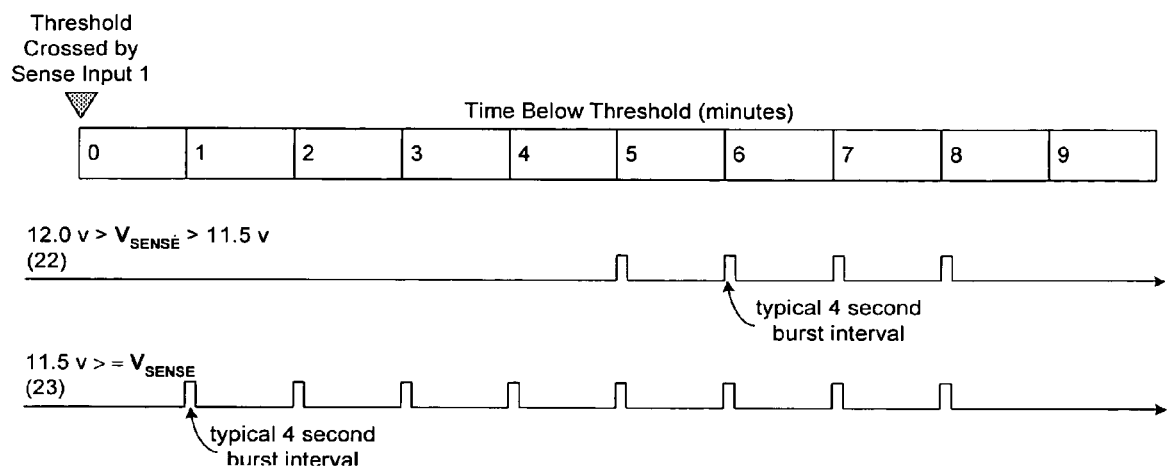
FIG. 4 is a timing diagram depicting multiple alarm mode timing of the preferred embodiment of the present invention.

The diagram in FIG. 4 illustrates multiple alarm mode timing of the preferred embodiment of the present invention. The top row of the diagram depicts the time in minutes after an event is started, which is triggered by the Sense Voltage 1 dropping below a threshold value. The second row 22 depicts the alarm intervals that occur when the Sense Voltage 1 has dropped below 12.0 volts, but is above 11.5 volts. The third row 23 depicts the alarm intervals that occur when the Sense Voltage 1 has dropped below 11.5 volts. The purpose of these two different timing schemes is to allow faster alarm indication when deeper discharging has occurred and a hold-off in alarm for slight voltage dips that may be only momentary, due to intermittent battery loading such as when a bucket lift motor is in operation.

The foregoing description of different embodiments, including a preferred embodiment of the invention, has been presented for purposes of illustration and description. This is not intended to be exhaustive or to limit the invention to the precise forms disclosed. Many modifications and variations will be apparent to practitioners skilled in this art, after viewing this Description and the Drawings. It is intended that the scope of the invention be defined by the following claims and their equivalents.

We claim:

1. A vehicle combined back-up and battery low-level alarm comprising:
   a back-up alarm circuit;
   a voltage sensing and comparing circuit;
   a timing circuit; and
   a gating circuit;
   wherein the gating circuit performs tone generation output in response to inputs from the back-up alarm circuit, voltage sensing and comparing circuit, and the timing circuit;
   wherein the voltage sensing and comparing circuit is responsive to two different voltage thresholds, and there is different alarm mode timing for each respective threshold; and,
   wherein the back-up alarm circuit has alarm mode precedence over the voltage sensing and comparing circuit.

2. The combined alarm of claim 1, which also comprises a signaling lamp.

3. The combined alarm of claim 2, which also comprises an ambient light sensor.

4. The combined alarm of claim 1, which is incorporated within a single housing.

* * * * *